(12) United States Patent
Naganawa et al.

(10) Patent No.: US 7,936,100 B2
(45) Date of Patent: May 3, 2011

(54) STATOR FOR ROTATING MACHINE AND ROTATING MACHINE USING THE SAME

(75) Inventors: Takashi Naganawa, Kasumigaura (JP); Takashi Ishigami, Hitachinaka (JP); Koji Obata, Hitachi (JP); Toshiaki Ueda, Naka (JP); Katsuhiro Hoshino, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/275,839

(22) Filed: Nov. 21, 2008

(65) Prior Publication Data

US 2009/0140595 A1 Jun. 4, 2009

(30) Foreign Application Priority Data

Nov. 22, 2007 (JP) ................................. 2007-302780

(51) Int. Cl.
*H02K 11/00* (2006.01)
(52) U.S. Cl. ........................................................ 310/71
(58) Field of Classification Search .................... 310/71, 310/179, 91
See application file for complete search history.

(56) References Cited

U.S. PATENT DOCUMENTS

| 2001/0048262 A1* | 12/2001 | Takano et al. ................. 310/179 |
| 2006/0163959 A1* | 7/2006 | Ogawa et al. .................... 310/71 |
| 2007/0248779 A1 | 10/2007 | Iio et al. |
| 2009/0179511 A1* | 7/2009 | Guercioni ....................... 310/71 |

FOREIGN PATENT DOCUMENTS

| JP | 3651491 B2 | 3/2005 |
| JP | 2006-204029 A | 8/2006 |
| JP | 2006-246594 A | 9/2006 |
| JP | 2007-259642 | 10/2007 |

OTHER PUBLICATIONS

Translation for JP 2006-204029.*
Office Action in Chinese Patent Application No. 200810182169.8 dated Aug. 24, 2010.

* cited by examiner

*Primary Examiner* — Nguyen N Hanh
(74) *Attorney, Agent, or Firm* — Crowell & Moring LLP (57) ABSTRACT

The stator includes a plurality of concentrated winding coils disposed coupled into an annular form through yokes, and a plurality of conductors that couple the coil ends of the concentrated winding coils to each other in a multi-phase connection fashion. Conductors for a U-phase, a V-phase, a W-phase, and neutral points P are each formed of a plurality of holes for inserting therethrough coil ends and are substantially circular with different diameters, and are disposed on the same plane. A connection plate provided with a wall is inserted between the conductors and the concentrated winding coils. A rotating machine includes the above-mentioned stator and a rotor that is rotatable within the stator.

10 Claims, 6 Drawing Sheets

STATOR FOR ROTATING MACHINE AND ROTATING MACHINE USING THE SAME

INCORPORATION BY REFERENCE

The disclosure of the following priority application is herein incorporated by reference: Japanese Patent Application No. 2007-096536 filed Apr. 2, 2007.

BACKGROUND OF THE INVENTION

1. Field of the Invention

The present invention relates to stator for a rotating machine and a rotating machine using the same.

2. Description of Related Art

Forms of winding of a stator include concentrated winding where a wire is wound in a concentrated manner for each tooth of a magnetic pole to prepare a coil and distributed winding where a wire is wound over a plurality of slots, with coils of different phases or same phases being superposed at coil ends. The concentrated winding can be made with a reduced coil end as compared with the distributed winding, and is effective for downsizing and making the rotating machine highly effective. On the other hand, in the case of the distributed winding, the distribution of magnetic field at the inner periphery of the stator can be made close to sine waves and a higher output than that of the concentrated winding can be obtained with reduced noises. Also, there is a method of using a copper wire having a square cross-section for a coil to increase the space factor of the coil in the slots of the stator and increase a density of current as means for achieving higher output from a rotating machine common to both types of winding.

Japanese Patent No. 3651491 discloses a technology according to which the coil ends of concentrated winding cores are inserted through connection holes of a printed board or a connection plate constituted by a plurality of copper plates, coil grooves that extends in an axial direction are provided corresponding to the positions of the connection holes, and the coil ends are connected to the respective connection holes by fusing peripheral walls of the coil grooves.

Japanese Laid-open Patent Publication No. 2006-204029 discloses a connection structure constituted by coil ends inserted through holes of a resin-molded bus bar (conductor) and the coil ends are connected to the bus bar via separate parts such as tubes and connectors. According to the technology disclosed in Japanese Laid-open Patent Publication No. 2006-204029, coil ends of U-, V-, and W-phases in order are repeatedly arranged in the peripheral direction. The lengths in the axial direction of the both ends of the coil are the same, so that radial positions of the coil ends to be inserted through the bus bar are the same.

According to Japanese Laid-open Patent Publication No. 2006-246594, a connection structure is adopted in which insulation layers and bus bars (conductor) are laminated and coil ends are inserted through holes provided in respective insulation layers and bus bars, with predetermined coil ends being connected to predetermined bus bars, respectively.

Each of the technologies of the above-mentioned patent references is adapted to be compliant to low voltage operations.

SUMMARY OF THE INVENTION

In the technology disclosed in Japanese Laid-open Patent Publication No. 2006-204029, the radial position of the coil end to be inserted through the annular bus bar is equal for all the coils. Therefore, for example, when one end of a U-phase coil and one end of a different U-phase coil are to be connected to each other with a bus bar and if a V-phase bus bar and a W-phase bus bar are arranged on the inward side of the ends of the same coil, the other ends of the V-phase and W-phase coils must be arranged on the outward side of the coil terminal. On the other hand, when one end of a W-phase coil and one end of a different W-phase coil are to be connected to each other through a bus bar and if a V-phase bus bar and a U-phase bus bar are arranged on the inward side of the ends of the same coil, the other ends of the V-phase and U-phase coils must be arranged on the outward side of the coil terminal. Therefore, the width of the stator in the radial direction increases. This raises a problem that the stator grows in size.

The technology disclosed in Japanese Laid-open Patent Publication No. 2006-246594 has a problem that the width of the coil end increases since the bus bars are stacked, so that the stator grows in size.

The connection plate disclosed in Japanese Patent No. 3651491 includes a printed board with which wires for three phases are connected. Therefore, the connection plate is not suited for rotating machines for high voltage operations although it is suitable for rotating machines for low voltage operations.

Accordingly, it is an object of the present invention to provide a stator with a reduced size and a rotating machine with a reduced size.

To achieve the above-mentioned object, the stator for a rotating machine according to the present invention includes a plurality of stator windings arranged in an annular form; and a plurality of conductors that connect coil ends of the stator windings in a multi-phase connection fashion to each other, wherein the plurality of conductors, which are each provided with a plurality of holes for inserting the coil end therethrough, are substantially circular, having different diameters, and disposed on the same plane. The rotating machine according to the present invention includes the above-mentioned stator and a rotor that is rotatable within the stator.

With this construction, a plurality of conductors that connect stator windings in a multi-phase connection fashion are each substantially circular in cross-section, so that the width in the radial direction of the stator can be minimized. Moreover, since a plurality of conductors is arranged on the same plane, the width in the axial direction of the coil ends can be reduced. Therefore, the stator and the rotating machine can be miniaturized. By inserting between the conductor and the stator winding a connection plate provided with walls for increasing creepage distance between the adjacent conductors, insulation properties can be increased. On this occasion, winding the stator windings around divided cores makes assembling easier.

According to the present invention, a stator with a reduced size and a rotating machine with a reduced size can be provided.

DETAILED DESCRIPTION OF PREFERRED EMBODIMENTS

First Embodiment

Figure 1:
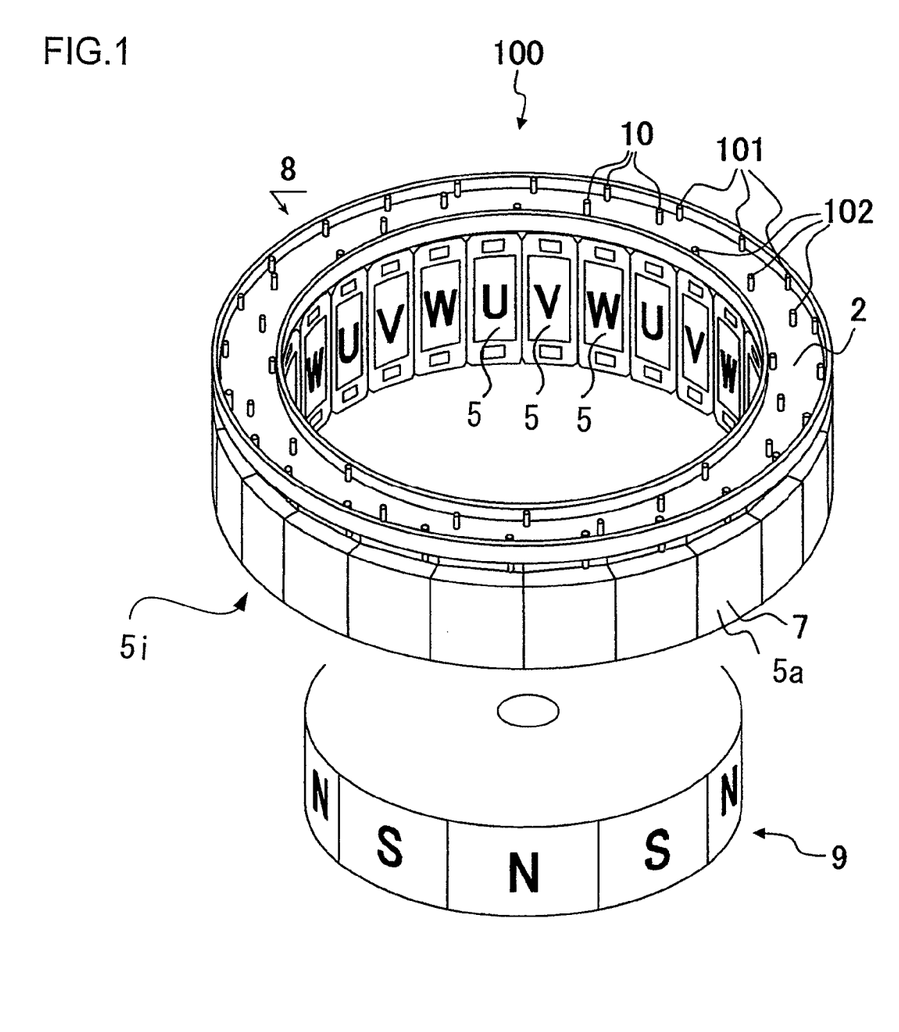
FIG. 1 is a perspective view of a rotating machine according to an embodiment of the present invention.

FIG. 1 is a perspective view of the rotating machine according to one embodiment of the present invention.

A rotating machine 100 includes a concentrated winding stator 8 and a rotor 9, arranged coaxially to each other. The rotor 9 includes a core and permanent magnets with respective N poles and S poles being arranged alternately on the side of the core.

The concentrated winding stator 8 is constituted by a plurality of concentrated winding coils 7 that are assembled in an annular form. Each concentrated winding coil 7 is constituted by a core 5 of a divided core structure (see FIG. 5) and an insulation coated conductor wire 1 (FIG. 6) wound around the core 5. On a side perpendicular to the axial direction of the stator is formed a connection plate 2 of an annular form and are formed coil ends. A plurality of through-holes 20 (FIG. 3) are formed in the connection plate 2 and coil ends 10 are inserted therethrough. In the present embodiment, the number of concentrated winding coils 7 is 24, and the coils of U-phase, V-phase, and W-phase are disposed repeatedly eight times.

Therefore, the total number of the coil ends 10 is 48. The twenty four (24) coil ends 101, which are volute tongue ends or ends at which winding has started, are disposed on the outer periphery side of the connection plate 2. The twenty four (24) coil ends 101, which are volute tongue ends, are mutually connected to form neutral points P. On the other hand, twenty four (24) coil ends 102, which are volute tail ends or ends at which winding has been finished, are divided into three phases (U-phase, V-phase, W-phase) each consisting of eight coil ends. These are disposed on an inner periphery side of the connection plate 2, at positions that are slightly moved over from each other in radial direction of the connection plate 2. The coil ends 102, which are volute tail ends, of the same phase are drawn out to the positions of the same radius. Eight (8) U-phase coils, eight (8) V-phase coils, and eight (8) W-phase coils are connected, respectively, to form a concentrated winding stator 8 of three-phase.

Figure 2A:
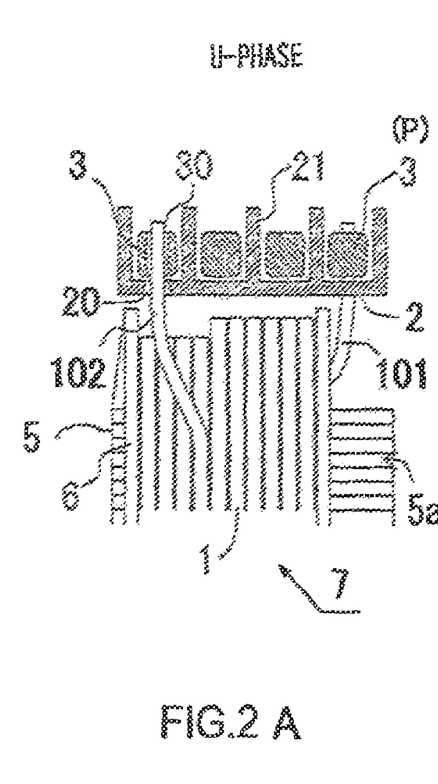
FIG. 2A-FIG. 2C each are partial sectional views of the concentrated winding coil.
Figure 2B:
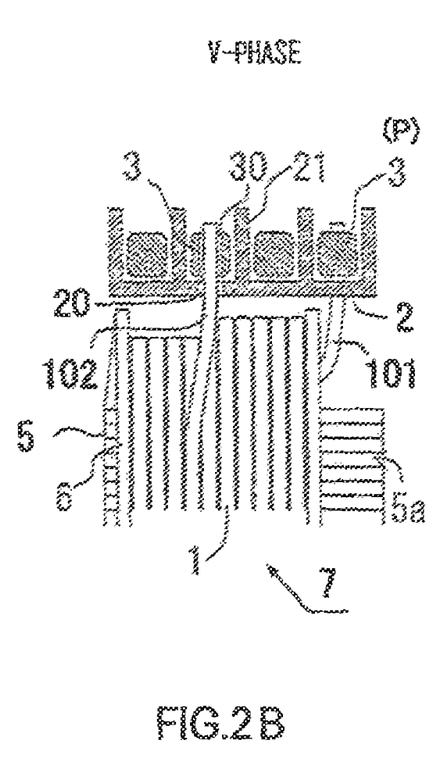
Figure 2C:
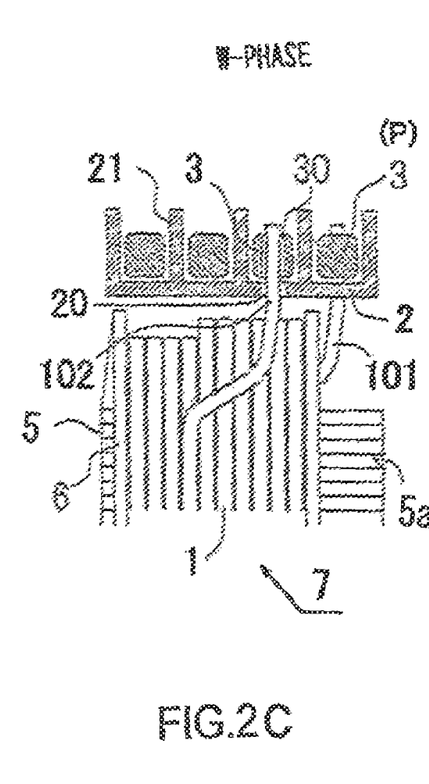

FIG. 2A-FIG. 2C each are a cross-section of a wire connection part of the concentrated winding coil 7 according to one embodiment of the present invention. The left of space corresponds to an inner periphery side of the concentrated winding coil 7, and the right of space corresponds to an outer periphery side of the concentrated winding coil 7.

FIG. 2A shows the state of wire connection of U-phase. The concentrated winding coil 7 includes the core 5 that is constituted by a stack of electromagnetic steel sheets, the bobbin 6 that is provided on the core 5 so as to cover the outer periphery of the side of the core 5, and stator coils that are constituted by insulation coated conductor wire 1 wound around a concave part of the bobbin 6. The coil ends 101 and 102 of the insulation coated conductor wire 1 are inserted both through the connection plate 2 and through either of the four conductors 3 (U-phase, V-phase, W-phase, and neutral point P). The four conductors 3 are substantially circular having different radii so that they can be disposed on an end of the stator in the axial direction (coil end part). They are disposed on the same plane in a single stage. The three conductors 3 (U-phase, V-phase, and W-phase) each have a width that is substantially the same as that of the bobbin 6. The conductor 3 for the neutral points P has a width substantially the same as that of a yoke 5a through which the cores 5 are connected to each other. Therefore, the four conductors 3 are disposed within the range of width in the radial direction of the concentrated winding stator 8.

The coil ends 101, which are volute tongue ends, are connected to the conductor 3 that is disposed at the outermost periphery side on the connection plate 2 to form neutral points P. The coil ends 102, which are volute tail ends, are connected to the conductor 3 that is disposed at the innermost periphery side on the connection plate 2 to form a U-phase. The connection plate 2 is provided with through-holes 20 and the conductor 3 is formed of connection holes 30 at the positions where the coil ends 10 are inserted, respectively, for the U-phase and the neutral point P though not shown for the neutral points P. With this structure, inter-phase insulation between the insulation coated conductor wire 1 and the conductor 3 with the connection plate being held therebetween is maintained. The connection plate is provided with walls 21 that enable respective conductors to be positioned and secure inter-phase insulation between the conductors 3.

FIG. 2B shows the state of wire connection of V-phase. The coil ends 102, which are volute tail ends, are connected to the conductor 3 that is second from the innermost periphery side disposed on the connection plate 2 to form a V-phase. The rest structures are the same as those of the U-phase. FIG. 2C shows the state of wire connection of W-phase. The coil ends 102, which are volute tail ends, are connected to the conductor 3 that is third from the innermost periphery side disposed on the connection plate 2 to form a W-phase. The rest structures are the same as those of the U-phase.

Winding of each coil ends in the center of the coil in the width direction. In the case of U-phase, the coil end 102, which is a volute tail end, extends obliquely to the left side in the drawing and then drawn out. In the case of V-phase, the coil end 102, which is a volute tail end, extends substantially linearly from the center of the coil in the width direction. In the case of W-phase, the coil end 102 extends obliquely to the right side in the drawing and drawn out.

Figure 3:
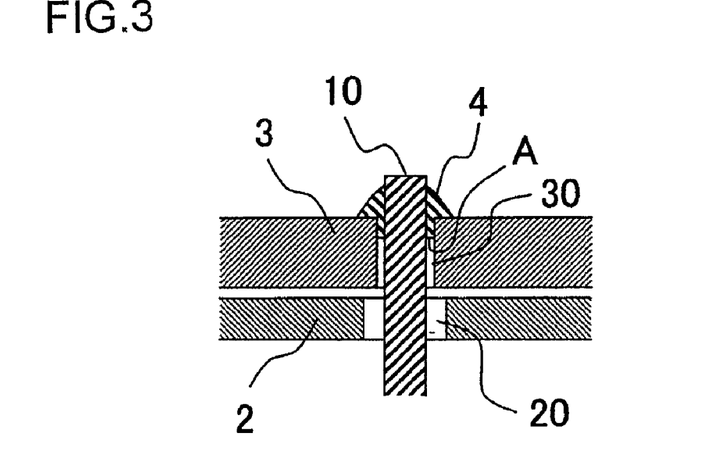
FIG. 3 is a cross-section of a connection part of the coil end and the conductor.

FIG. 3 is a cross-section of the connection part in which the coil end 10 used in the concentrated winding stator 8 of the rotating machine is connected with the conductor 3 that connects the coils with each other. The connection part includes the conductor 3 that is formed of the connection hole 30, the connection plate 2 that is formed of the through-hole 20, the coil end 10, and a welded part 4, which is a junction part. The connection plate 2 is made of an insulation material. The conductor 3 is disposed on the surface of the connection plate 2 and is of an annular shape. The through-hole 20 and the connection hole 30 are formed coaxially with each other and the coil end 10 is inserted therethrough. On the surface of the conductor 3 on the side opposite to the side of the connection part 2, the edge of the coil end 10 is disposed. The weld 4 is formed by TIG (Tungsten Inert Gas) welding is obtained by fusing the entire periphery of the coil end 10. The fused metal flows in over the entire inner peripheral surface in a depth to a point A. As a result, the weld 4 connects the coil end 10 and the conductor 3 mechanically and electrically.

In order to secure the creepage distance of the connection plate, the diameter of the through-hole 20 is set larger than the diameter of the connection hole 30, so that the coil end 10 is prevented from contacting the inner surface of the through-hole 20. For instance, in the present embodiment, the diameter of the coil end 10 is set to about 1.2 mm. The diameter of the connection hole 30 is set to about 1.8 mm with providing a space of about 0.3 mm that is proper to allow the fused matter by welding to flow in and remain there. In order to give allowances for errors in positioning of the connection hole 30 of the conductor 3 and in positioning of the coil end 10, the diameter of the through-hole 20 is set to 3 mm.

Figure 4A:
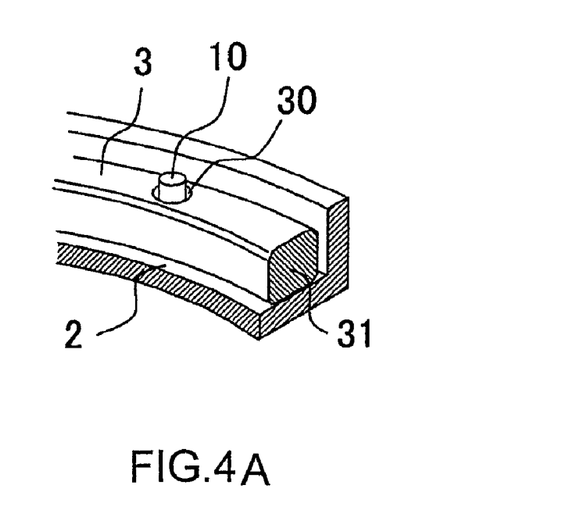
FIG. 4A and FIG. 4B each are a perspective view of the connection part of the coil end and each conductor.
Figure 4B:
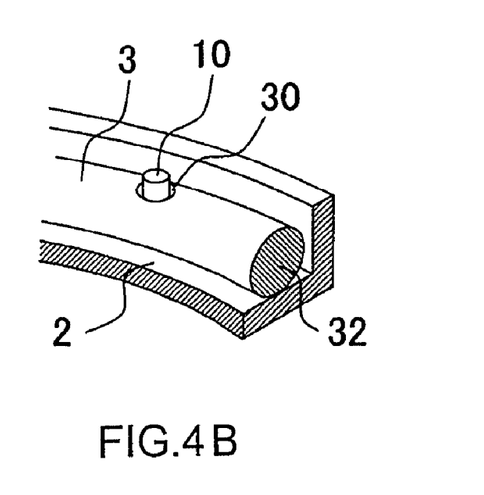

FIG. 4A and FIG. 4B each are a perspective view of the connection part of the coil end 10 and the conductor 3.

FIG. 4A shows the case where the cross section of the conductor 3 is in the form of a rectangular body 31. The conductor 3 that is disposed on the surface of the connection plate 20 is formed of the connection hole 30. The coil end 10 is inserted through the connection hole 30 and the edge of the coil end 10 protrudes from the upper surface of the conductor 3. Then the edge of the coil end 10 and the surrounding of the connection hole 30 are fused by TIG welding to join the coil end 10 and the conductor 3. Also, an L-shaped cross section is shown, which is a part of the connection plate 2 in the figure.

FIG. 4B shows the case where the conductor 3 that has a circular cross-section, i.e., a circular body 32 is used. The basic form is the same as that shown in FIG. 4A. When the approximately rectangular body 31 and the circular body 32 are compared with each other, the approximately rectangular body 31 has a smaller height in size of the conductor 3 than the circular body 32, so that the coil end can be made smaller provided that the cross section of the conductor 3 is the same.

Figure 5A:
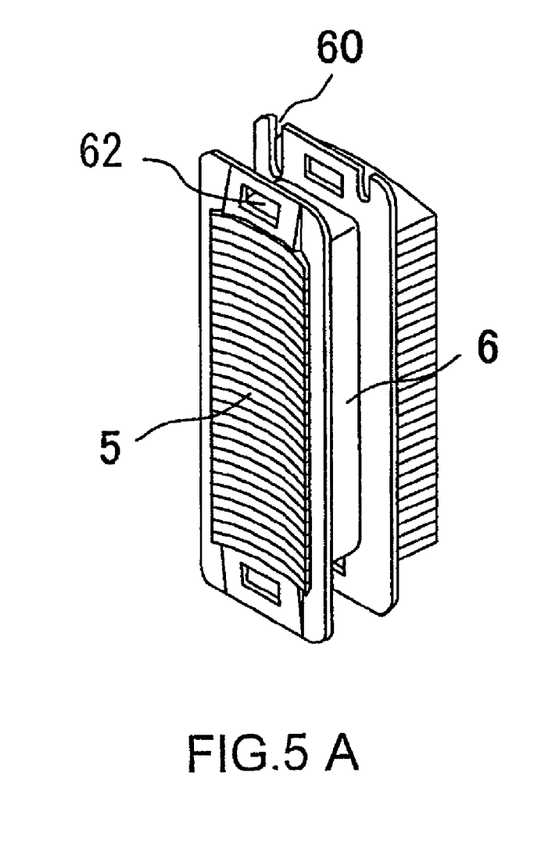
FIG. 5A and FIG. 5B each are a perspective view of the concentrated winding coil.
Figure 5B:
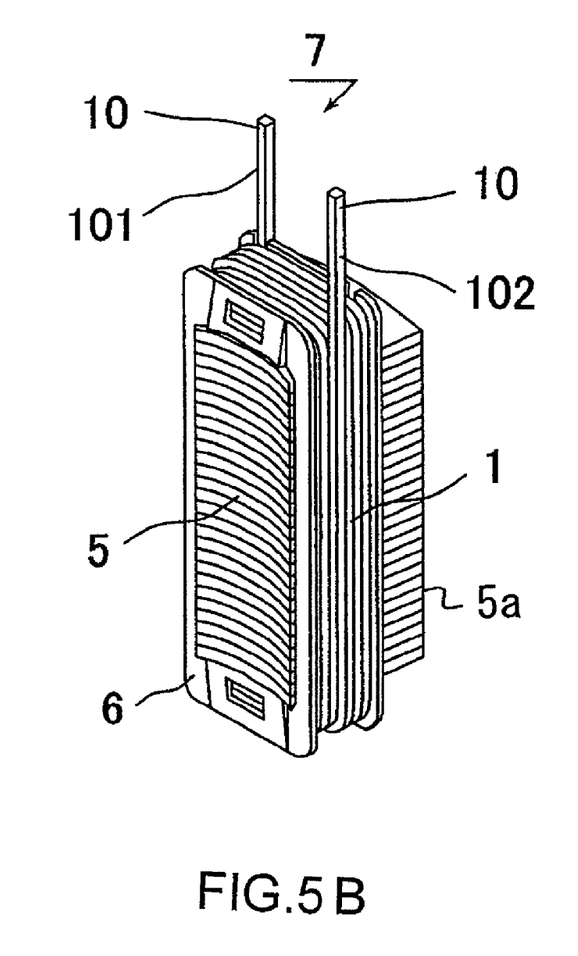

FIG. 5A is a perspective view of a divided core used in the concentrated winding stator and FIG. 5B is a perspective view of the concentrated winding coil. Referring to FIG. 5A, the core 5 is formed by stacking electromagnetic steel sheets in the axial direction of the rotating machine 100 (FIG. 1) to reduce eddy current loss. The bobbin 6 is an insulating material that defines a hollow space in the form of quadrangle in the radial direction of the stator such that four sides thereof at right angles to each other cover the space. Each side of the quadrangular bobbin 6 is formed in the form of a concave. On the upper part of the bobbin 6 is provided with notches 60 in which the coil ends 10, which are volute tongue, are inserted, respectively. On the upper and lower parts, there are formed of four openings 62 for cooling the coil.

Referring to FIG. 5B, the concentrated winding coil 7 is a coil that is obtained by winding the insulation coated conductor wire 1 having substantially rectangular cross-section around the concave part of the bobbin 6 (that is, tooth of the core 5). As a result, a magnetic field is generated in the direction perpendicular to a plane on which the coil is wound (in the radial direction of the concentrated winding stator 8). The concentrated winding coil 7 maintains insulation properties between the core 5 and the insulation coated conductor wire 1 by winding the insulation coated conductor wire 1 around the bobbin 6. The concentrated winding coil 7 has two coil ends 10, i.e., the coil end 101, which is a volute tongue end, and the coil end 102, which is a volute tail end, per coil. The yoke 5a of the core 5 is to connect the cores 5 to each other to construct the cylindrical concentrated stator 8. That is, the stator winding wire is wound around the divided core 5. The stator winding is wound around to divided core 5, and a plurality of cores 5 is coupled via the yokes 5a cylindrically to constitute a magnet core 5i of the stator. The conductors 3 are located on a side perpendicular to the axial direction of the stator core. The cross-section of the insulation coated conductor wire 1 may be either circular or substantially rectangular. In the present embodiment, for the purpose of increasing the space factor of the coil in a core slot (not shown), explanation is made on the case where the cross-section of the insulation coated conductor wire 1 is substantially rectangular.

Figure 6A:
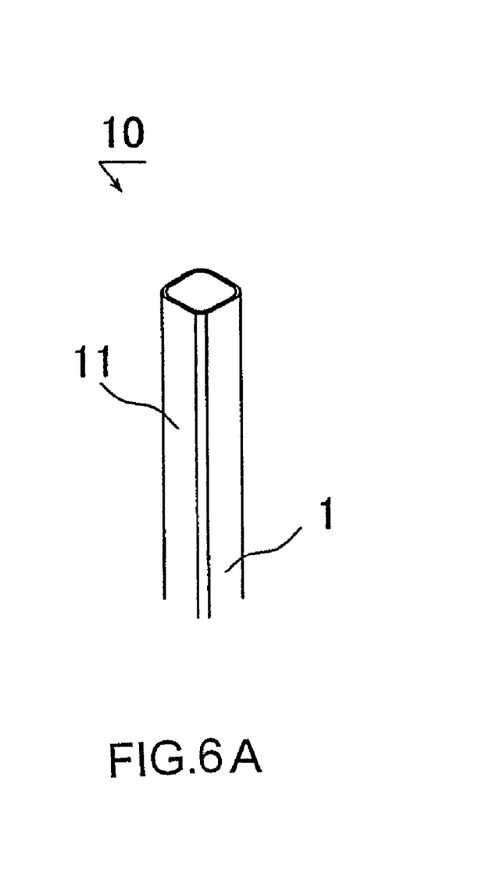
FIG. 6A-FIG. 6C each are a perspective view that shows a step of peeling a film of the insulation coated conductor wire.
Figure 6B:
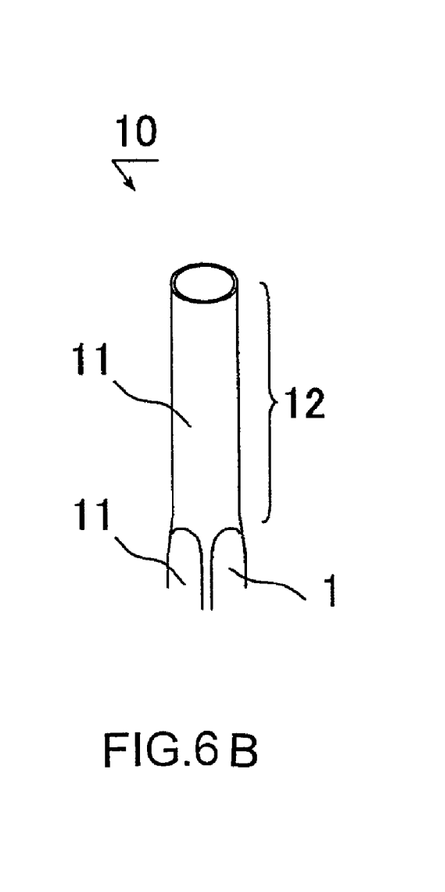
Figure 6C:
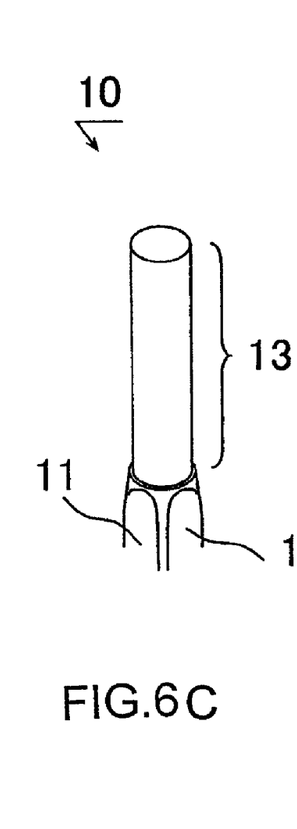

Since it is necessary to peel off the insulation coating from the conductor wire before the coil end 10 and the conductor 3 (FIG. 3) are connected, the processing steps of the coil end 10 is described with reference to FIG. 6A to FIG. 6C. FIG. 6A-FIG. 6C are each a perspective view that shows the step of film peeling of the insulation coated conductor wire. The space factor of the coil can be increased by making the cross-section of insulation coated conductor wire 1 substantially rectangular. FIG. 6A shows the coil end 10 that is covered with the insulation coating 11 to the tip of the insulation coated conductor wire 1 by the insulation coating 11. Since the cross-section is substantially rectangular, the corners of the insulation coated conductor wire 1 tend to contact the edge of the through-hole 20 or the connection hole 30 (FIG. 3), so that it is difficult for the conductor wire 1 to pass through the hole. Then, a profile formation part 12 of the end coil 10 is pressed with a die (not shown) to mold the coil end 10 so as to have a substantially circular cross-section. Under such a condition, the profile formation part 12 is covered by the insulation coating 11. Next, an internal rotating cutter (not shown) is applied to a coating peeling part 13 to peel the insulation coating 11 as shown in FIG. 6C. In this manner, the coil end 10 having a circular cross-section with the insulation coating being peeled can be obtained from the insulation coated conductor wire 1 having substantially rectangular cross-section.

As described above, according to the present embodiment, the profile of the coil end 10 of the insulation coated conductor wire 1 that constitutes the concentrated stator 8 is as is or molded into a substantially circular form, the insulation coating of the coil end 10 is peeled off, the connection plate 2 made of an insulation material is formed of the through-hole 20, and the conductor 3 disposed on the surface of the connection plate 2 is formed of the connection hole 30. Next, the coil end 10 is inserted through the through-hole 20 and the connection hole 30, and the coil end 10 and the conductor 3 are joined by welding or soldering or the like. As a result, the size of the coil end of concentrated winding stator 8 is reduced.

Since radii of positions where the coil ends 102, which are volute tail ends, are drawn out are made uniform for each of U-phase, V-phase, W-phase, and neutral point P, the conductor 3 can be made circular and three conductors 3 can be disposed within the width of the bobbin 6. The conductor for the neutral points P can be disposed by using the width in the radial direction of the yoke 5a. Therefore, the conductors 3 can be disposed by effectively using the width in the radial direction of the concentrated winding stator 8. Since the plurality of conductors 3 can be disposed in the direction of the rotation axis in one stage, the length of the coil end can be reduced. That is, since the length of the direction of the rotation axis of the coil end can be reduced, the shaft vibration when the rotating machine 30 is rotated can be reduced. As a result, the shaft vibration is reduced even if the rotating machine rotates at high speeds and stable operation can be achieved. Since the connection plate 2 is inserted between the conductors 3 and the coils, insulation properties can be improved without increasing the spatial distance. The walls 21 provided to the connection plate 2 can increase the insulation properties between the conductors 3. These enable downsizing of the motor with maintaining the performance of the motor and simplification of the structure, so that the reliability of production can be improved.

Second Embodiment

Figure 7:
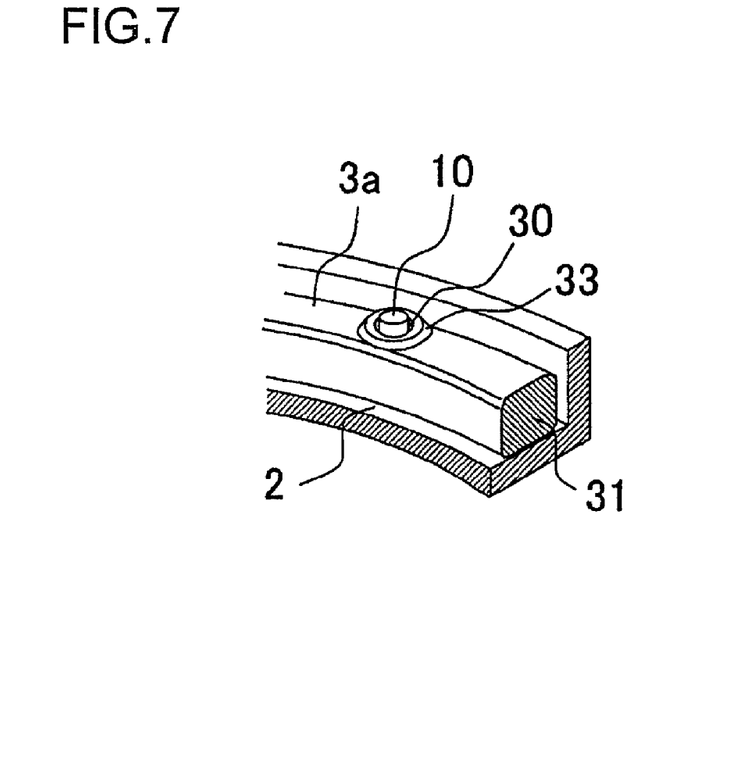
FIG. 7 is a perspective view that shows a connection part of the coil end and the conductor according to a second embodiment.

In the first embodiment, the conductor 3 provided with connection hole 30 and the coil end 10 are simply welded. However, provision of a protrusion in the connection hole 30 can increase the junction area with the coil end 10. FIG. 7 is a perspective view that shows a connection part of the coil end 10 and the conductor 3a provided with a salient 33 according to a second embodiment.

A conductor 3a of the substantially rectangular cross-section is disposed on the surface of the connection plate 2, and the conductor 3a is formed of the salient 33 and of the connection hole 30. The coil end 10 is inserted through the connection hole 30 and a leading edge of the coil end 10 protrudes from the conductor 3. After the insertion, the coil end 10 and the surrounding of the connection hole 30 are fused by TIG welding to join the coil end 10 and the conductor 3a. The length of the inner periphery in the axial direction increases by having formed the salient 33 to the conductor 3a to increase a junction area, and the reliability of the junction increases further.

Third Embodiment

Although the inner diameters of the through-hole 20 and of the connection hole 30 are made constant, respectively, Both may be provided with tapered parts, respectively, to make it easier to fabricate the stator.

Figure 8:
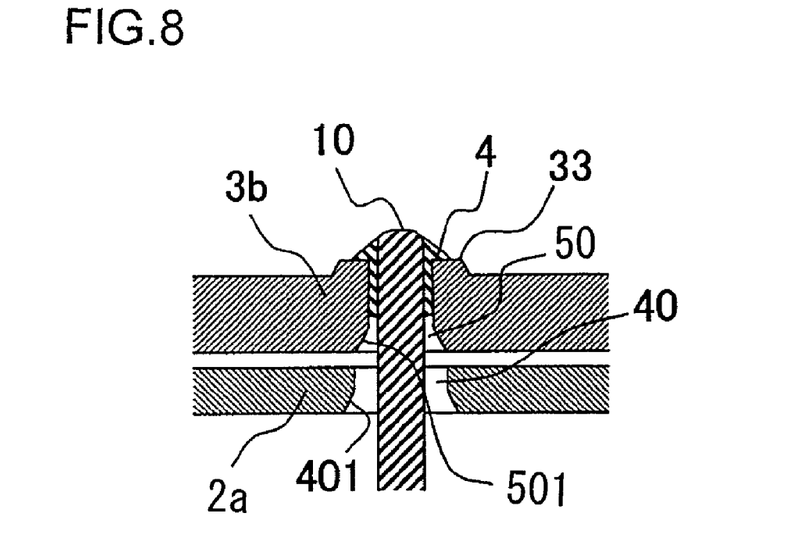
FIG. 8 is a cross-section that shows a connection part of the coil end and the connection of the conductor to a third embodiment.

FIG. 8 is a cross-section of a connection part between the coil end 10 and a conductor 3b formed of a connection hole and a tapered part in the connection hole. The conductor 3b is disposed on a connection plate 2a that is formed of a through-hole 40 with a tapered part. The through-hole 40 provided in the connection plate 2a has a part that corresponds to the through-hole 20 in the first embodiment and the second embodiment on the conductor 3b side (upper part in the figure), and subsequent thereto a tapered portion 401 of an angle of 30 degrees that opens on the other side of the conductor 3b, that is, on the entrance side of the coil end (lower side in the figure). On the other hand, a connection hole 50 is formed in the conductor 3b, and the connection hole possesses a part that corresponds to the connection hole 30 in the first embodiment and the second embodiment on the exit side of the coil end 10 (upper part in the figure), and subsequent thereto has a tapered portion 501 on the connection plate 2a (lower side in the figure). The edge of the coil end 10 is disposed in the upper part of the conductor 3b through the through-hole 40 and the connection hole 50. The diameter of the coil end 10 is about 1.2 mm. The part of the connection hole 50 that corresponds to the connection hole 30 of the first embodiment and the second embodiment has a diameter of about 1.8 mm. The part of the through-hole 40 that corresponds to the through-hole 20 of the first embodiment and the second embodiment has a diameter of about 3 mm. Due to the tapers 401 and 501 provided in the through-hole 40 and the connection hole 50, respectively, the diameters of the through-hole 40 and of the connection hole 50 are larger on the entrance side, which makes it easier to insert the coil end 10 therethrough. The coil end 10 and the conductor 3b are connected by welding to obtain the welded part 4. Although connection by TIG welding is adopted in the present embodiment, the connection may also be achieved by soldering.

In the present embodiment, the connection plate 2 provided with the walls 21 is used on condition that the stator is applied to a high voltage electromotor. However, in the case of a low voltage electromotor, which needs no insulation with the walls 21, the connection plate 2 does not need be provided and the coil end may be directly inserted through the hole of the conductor 3 to connect the conductor 3 and the coil end 10. By adopting the above-mentioned structure, the size of the coil end of the stator is reduced, so that a small stator can be obtained.

Comparative Embodiment

Generally, to cope with high voltages, it is necessary to secure spatial distance or creepage distance between conductors to satisfy insulation properties. For example, the following three technologies are conceivable for rotating machines. In the first one, there is provided a structure in which a terminal is provided in the bus bar, and the coil end is connected to the obtained terminal part. In the second one, there is provided a structure in which a terminal of a separate component is connected to a conductor called a bus ring and this terminal and the coil end are connected. These structures each have a large size in the direction of the height of the coil end of the stator due to existence of the terminal. In the third one, there is provided a structure in which the conductor is continually folded twice in the direction at right angles to connect the edge of the conductor and the coil end. This tends to increase the size of the connection part of the coil end in both the radial direction and the axial direction of the rotor. The conductor is disposed on both the connection plate made of an insulating material and the insulating property is satisfied.

Modification

The present invention is not limited to the above-mentioned embodiments, and for instance, the following modifications can be made.

In each of the above-mentioned embodiments, a concentrated winding stator is adopted. However, the method for connecting the wires may be applied to a distributed winding stator. In each of the above-mentioned embodiments, Y-connection is used. However, Δ-connection that involves no Neutral points P may also be used. In each of the above-mentioned embodiments, explanation has been made on condition that the rotating machine is of three-phase type. However, the present invention can also be applied to rotating machines of n-phase type.

The above described embodiments are examples and various modifications can be made without departing from the scope of the invention.

What is claimed is:

1. A stator for a rotating machine, comprising:
a plurality of stator windings arranged in an annular form;
a plurality of conductors that connect coil ends of the stator windings in a multi-phase connection fashion to each other; and
a connection plate made of an insulation material that is interposed between the stator windings and the conductors, wherein
the plurality of conductors, which are each provided with a plurality of holes for inserting the coil end therethrough, are substantially circular, having different diameters, and disposed on the same plane,
the connection plate is formed of a hole through which the coil end is inserted, and the connection plate is provided with a wall that increases a creepage distance between the connection plate and the conductor adjacent thereto.

2. A stator for a rotating machine according to claim 1, wherein the stator windings are connected in a three-phase Y-connection fashion to form a U-phase, a V-phase, and a W-phase as well as neutral points, the conductor for the neutral points is arranged on the same plane, and one end of the stator winding is connected with either of the conductors for the U-phase, the V-phase and the W-phase, and the other end of the stator winding is connected with the conductor for the neutral points.

3. A stator for a rotating machine according to claim 1, wherein the hole formed in the connection plate has a diameter larger than that of the hole formed in the conductor.

4. A stator for a rotating machine according to claim 1, wherein each of the stator windings is wound around one of a plurality of divided cores, the divided cores are coupled with each other in a cylindrical fashion through respective yokes thereof, and the conductors are located in a side surface perpendicular to the axial direction of the stator core being formed by coupling.

5. A stator for a rotating machine according to claim 1, wherein the stator winding is formed by winding an insulation coated conductor wire that is substantially rectangular in cross-section, and the part of the stator winding constituting the coil end has a substantially circular profile.

6. A stator for a rotating machine according to claim 1, wherein the conductor is substantially rectangular or circular in cross-section.

7. A stator for a rotating machine according to claim 1, wherein the plurality of stator windings comprises an insulation coated conductor wire that has an insulation coating thereon.

8. A stator for a rotating machine according to claim 7, wherein the coil end of the stator winding has a substantially circular shape in cross-section, the insulation coating of the insulation coated conductor wire is peeled off at the coil end, and the stator further comprises a junction part in which the coil end and the conductor are joined.

9. A stator for a rotating machine according to claim 8, wherein the junction part is joined by welding or soldering.

10. A rotating machine comprising:

a stator for a rotating machine according to claim 1; and a rotor that is rotatable within the stator.

\* \* \* \* \*